United States Patent
Baek et al.

(10) Patent No.: US 9,713,182 B2
(45) Date of Patent: Jul. 18, 2017

(54) METHOD AND APPARATUS FOR DEVICE TO DEVICE COMMUNICATION

(71) Applicant: Samsung Electronics Co., Ltd, Gyeonggi-do (KR)

(72) Inventors: Youngkyo Baek, Seoul (KR); Beomsik Bae, Gyeonggi-do (KR); Songyean Cho, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 8 days.

(21) Appl. No.: 14/166,745

(22) Filed: Jan. 28, 2014

(65) Prior Publication Data

US 2014/0213250 A1 Jul. 31, 2014

(30) Foreign Application Priority Data

Jan. 28, 2013 (KR) .................. 10-2013-0009353
Jul. 15, 2013 (KR) .................. 10-2013-0083119

(51) Int. Cl.
*H04W 4/00* (2009.01)
*H04W 76/02* (2009.01)
*H04W 8/00* (2009.01)
*H04W 8/26* (2009.01)

(52) U.S. Cl.
CPC ......... *H04W 76/023* (2013.01); *H04W 8/005* (2013.01); *H04W 8/26* (2013.01)

(58) Field of Classification Search
CPC ..... H04L 45/02; H04M 1/7253; H04W 4/008; H04W 8/005
See application file for complete search history.

(56) References Cited

U.S. PATENT DOCUMENTS

| 8,948,107 | B2* | 2/2015 | Vasudevan | H04W 72/04 370/329 |
| 2005/0025117 | A1* | 2/2005 | Inagaki | H04L 45/02 370/350 |
| 2007/0195783 | A1* | 8/2007 | Faucher | H04L 69/329 370/395.2 |
| 2007/0211678 | A1* | 9/2007 | Li | H04W 40/244 370/338 |
| 2010/0009675 | A1 | 1/2010 | Wijting et al. | |

(Continued)

OTHER PUBLICATIONS

International Search Report, dated May 23, 2014 in connection with International Patent Application No. PCT/KR2014/000795, 3 pages.

(Continued)

*Primary Examiner* — Tammy Paige Goddard
*Assistant Examiner* — Frantz Bataille

(57) ABSTRACT

A method and apparatus for performing a device-to-device (D2D) communication by a user equipment and supporting D2D communication by a communication entity. The D2D communication method may include: acquiring ProSe ID of the UE or the UE's user, which is used in the D2D communication; generating an expression by using the ProSe ID; broadcasting the generated expression; receiving a direct D2D connection request message from another UE over a core network; sending a direct connection accept message in response to the direct D2D connection request message; and performing the D2D communication with another UE. Accordingly, D2D communication can be efficiently performed.

20 Claims, 8 Drawing Sheets

(56) References Cited

U.S. PATENT DOCUMENTS

2011/0317569 A1* 12/2011 Kneckt ............ H04W 74/0833
370/252
2012/0159167 A1  6/2012 Lee et al.
2013/0016657 A1  1/2013 Muhanna et al.

OTHER PUBLICATIONS

Extended European Search Report in connection with EP Application No. 14152831.5, Jul. 21, 2014, 6 pages.
Huawei, Hisilicon "Architecture Consideration for Proximity Services with Infrastructure", SA WG2 Meeting #95 S2-130122, 3GPP SA WG2 TD, Jan. 28-Feb. 1, 2013, 4 pages.
XP-002726374 3GPP TR 22.803 v12.0.0 (Dec. 2012); 3rd Generation Partnership Project; "Technical Specification Group Services and System Aspects"; Feasibility study for Proximity Services (ProSe) Release 12, 40 pages.

* cited by examiner

METHOD AND APPARATUS FOR DEVICE TO DEVICE COMMUNICATION

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0009353, filed on Jan. 28, 2013 and Korean Patent Application No. 10-2013-0083119 filed Jul. 15, 2013, which are hereby incorporated by reference for all purposes as if fully set forth herein.

TECHNICAL FIELD

At least of some embodiments of the present disclosure relate to a wireless cellular communication system-based device-to-device (D2D) communication.

BACKGROUND

D2D communication refers to a communication mode between a pair of user equipments (UEs) that enables a UE to directly communicate and exchange data with a neighboring UE without the help of a cellular network, and each UE for D2D communication (hereinafter referred to as "D2D UE") broadcasts the UE's own information in order to inform other UEs of information on itself. A UE's own information used to inform other UEs of information on itself may include, for example, the identifier (ID) of the UE or the ID of UE's user (hereinafter referred to as "proximity service ID", "ProSe ID", or "D2D ID"). In addition, a UE acquires information on counterpart UEs through expressions received from neighboring UEs, and attempts to perform D2D communication when discovering a counterpart UE of interest from this information.

Communication providers try to make a profit by providing D2D communication by using their underused licensed spectra or using unallocated radio resources in cellular networks and the like. Thus, they are seeking a way to provide D2D communication and control D2D services, based on a cellular network.

Therefore, there is a need for a way to detect an ID, allocated in a cellular network (e.g., GUTI (Globally Unique Temporary UE Identity), from the ID of a UE or the ID of a UE's user (e.g., ProSe ID), used in D2D communication, in order to control paging and the like of the corresponding UE in the cellular network.

SUMMARY

To address the above-discussed deficiencies, it is a primary object to provide a device-to-device (D2D) communication apparatus and method capable of efficiently performing D2D communication.

According to an embodiment of the present disclosure, there is provided a method of performing a device-to-device (D2D) communication by a user equipment (UE), the method including: acquiring a proximity service identifier (ProSe ID) of the UE or the UE's user, which is used in the D2D communication; generating an expression by using the ProSe ID; broadcasting the generated expression; receiving a direct D2D connection request message from another UE over a core network; sending a direct connection accept message in response to the direct D2D connection request message; and performing the D2D communication with another UE.

According to an embodiment of the present disclosure, there is provided a method of performing a device-to-device (D2D) communication by a user equipment (UE), the method including: receiving an expression broadcasted by another UE; acquiring a proximity service identifier (ProSe ID) of another UE or another UE's user; sending a direct D2D connection request message to another UE over a core network; receiving a direct connection accept message in response to the direct D2D connection request message; and performing the D2D communication with another UE by using the ProSe ID.

According to an embodiment of the present disclosure, there is provided a method of supporting device-to-device (D2D) communication by a communication entity, the method including: receiving a direct connection request message, requesting a connection with a second user equipment (UE), from a first UE; sending a paging message to the second UE; forwarding the direct connection request message to the second UE after the second UE is in a connected state; receiving a direct connection accept message from the second UE in response to the direct connection request message; and forwarding the direct connection accept message to the first UE.

According to at least some embodiments of the present disclosure, D2D communication can be efficiently performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, embodiments of the present disclosure will be described in detail with reference to the accompanying drawings. In the following description of the present disclosure, a detailed description of known functions and configurations incorporated herein will be omitted when it may make the subject matter of the present disclosure rather unclear. Further, although an evolved packet core (EPC) network, that is, an LTE network, is described herein as an example of a cellular network, embodiments of the present disclosure may also be applied to wireless data communication networks other than the LTE network.

At least some embodiments of the present disclosure relate to a method and apparatus in which a user equipment (hereinafter referred to as "UE") discovers another counterpart UE located in a short range, establishes a data connection with the counterpart UE by paging the counterpart UE in order to perform D2D communication with the counterpart UE, and then performs D2D communication with the counterpart UE. Further, at least some embodiments of the present disclosure relate to a method and apparatus in which a UE configures the UE's own expression that the UE broadcasts in order to find a counterpart UE through a cellular network. Further, at least some embodiments of the present disclosure relate to a method and apparatus in which when a UE attempts to page a counterpart UE through a cellular network or establish a data connection to a counterpart UE in order to perform D2D communication with the counterpart UE, the UE controls authorization including whether D2D communication is possible. Further, at least some embodiments of the present disclosure relate to a method and apparatus in which a UE forwards the UE's ID used in D2D communication (proximity service ID, ProSe ID, or D2D ID) to a cellular network.

In the following embodiments of the present disclosure, a method of performing EPC network-based D2D communication will be described in detail. In an embodiment of the present disclosure, although an EPC network will be mainly described by way of example, any other type of core of a cellular-based network may replace the EPC.

Figure 1:
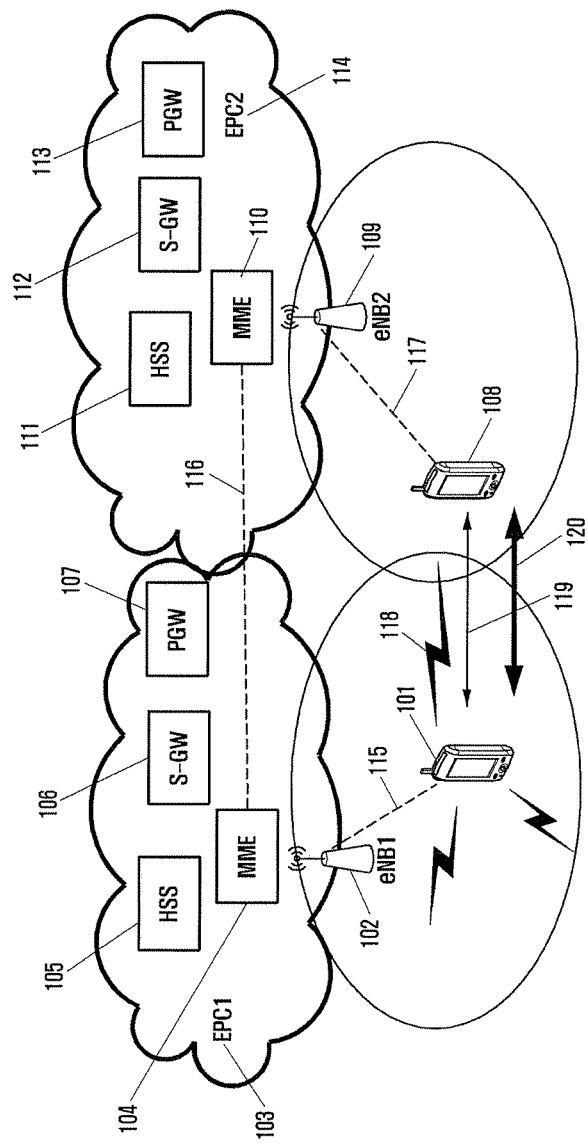
FIG. 1 illustrates an example of an architecture for EPC network-based D2D communication.

FIG. 1 illustrates an example of an architecture for EPC network-based D2D communication. Evolved packet core 1 (EPC 1) 103 includes a home subscriber server (HSS) 105, a serving gateway (S-GW) 106, a packet data network gateway (PDN-GW; P-GW) 107, and a mobility management entity (MME) 104. UE 1 101 is connected to the EPC 1 103 via evolved node B 1 (eNB1) 102. EPC2 114 includes an HSS 111, an S-GW 112, a P-GW 113, and an MME 110. UE2 109 is connected to the EPC2 114 via eNB2 109. The two MMEs 104, 110 may be connected to each other 116, or the two EPC 103, 104 may share one MME with each other.

The UE1 101 and the UE2 108 are connected to the EPC1 103 and the EPC2 114 respectively. Both the UE1 101 and the UE2 108 can perform D2D communication. Each UE broadcasts an expression corresponding to itself over a discovery channel in order to allow neighboring UEs to receive (listen to) the expression. In this scenario, the UE1 101 broadcasts the UE's own expression 118.

Upon receiving the broadcasted expression 118, the UE2 108 detects the ProSe ID (or other IDs) of the UE1 101 through the received expression 118. When the UE2 108 desires D2D communication with the UE1 101, the UE2 108 performs an operation for finding the UE1 101 in a cellular network. As an example, the UE2 108 forwards information on the UE1 101, such as the ProSe ID, to the EPC2 114 via the eNB2 109 to thereby scan the UE1 101. Such a scan request may be forwarded to the EPC1 103 via the EPC2 114. The EPC1 103 detects the ID of the UE1 101 in the EPC1 103. The EPC1 103 informs the UE1 101 via the eNB1 102 that the D2D communication request is received from the UE2 108. When the UE1 101 accepts the D2D communication request, a notification of this acceptance is in turn forwarded to the UE2 108, and thus a data connection context and the like between the UE 1 101 and the UE2 108 are established. Based on this, the UE2 108 performs D2D RRC configuration with the UE1 101, and then performs D2D communication with the UE1 101.

Figure 2:
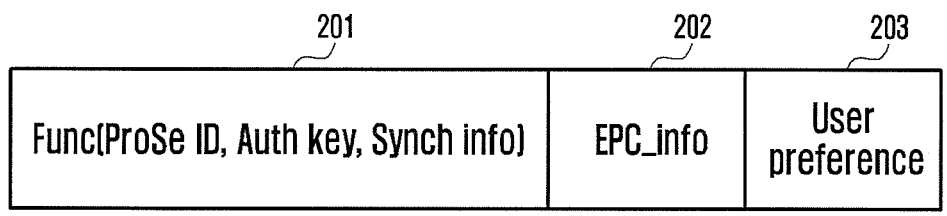
FIG. 2 illustrates a structure of an expression according to an embodiment of the present disclosure.

FIG. 2 illustrates a structure of an expression according to an embodiment of the present disclosure.

According to an embodiment of the present disclosure, a UE may generate and broadcast an expression, which has a structure as shown in FIG. 2, over a discovery channel in order to receive permission for D2D communication and perform D2D communication.

Referring to FIG. 2, the expression includes an identification information field 201, an EPC information field 202, and a user preference field 203.

A UE may generate a ProSeID-containing identification information field 201 with a value that is produced using a ProSe ID allocated thereto, an authorization key (Auth key) received when obtaining authorization to use a D2D communication service, information open to other UEs (the public), and the like. The UE may further generate an EPC information field 202 including information regarding an EPC network accessed by the UE and a user preference field 203 including information on preferences or situations of the UE's user. The expression may be configured to include the above fields 201, 202, 203. For the purpose of security for a ProSe ID, the identification information field 201 may be generated using a hash function. In such a case, a UE receiving the expression may generate identification information for ProSe IDs in the UE's friend list by using a hash function in the same manner. A ProSe ID corresponding to the same identification information as the received identification information is the ProSe ID of a counterpart UE that has sent the expression received by the UE.

The EPC information field 202 including information regarding an EPC network accessed by the UE may include the ID of a group or network equipment accessed by the UE. As an example, the EPC information field 202 may include an ECGI (E-UTRAN Cell Global Identifier), a TAI (Tracking Area Identity), a GUMMEI (Globally Unique MME Identity), or at least one or all of them. Alternatively, the EPC information field 202 may include only a part of one of the above IDs. As an example, the EPC information field 202 may include only a PLMN ID (Public Land Mobile Network Identifier).

However, the EPC information field 202 may also include the ID of the UE, allocated from an EPC network accessed by the UE, instead of the ID of a group or network equipment accessed by the UE. As an example, the EPC information field 202 may include an ECGI and a CRNTI (Cell-Radio Network Temporary Identifier). Alternatively, the EPC information field 202 may include at least one of an S-TMSI (SAE Temporary Mobile Subscriber Identity), a GUTI (Globally Unique Temporary UE Identity), and an IMSI (International Mobile Subscriber Identity). Alternatively, the EPC information field 202 may include only a part of one of the above IDs.

For the purpose of security, the EPC information field 202 including information regarding an EPC network accessed by the UE and the user preference field 203 including information on the UE's user may be encrypted using an encryption key shared through an authorization procedure and the like. The authorization procedure will be described below in detail in connection with step 356 in FIG. 3a or step 456 in FIG. 4a.

Further, when the EPC information field 202 including information regarding an EPC network accessed by the UE includes the ID of the UE, allocated from the EPC network accessed by the UE, a different method may be used for security. In the EPC information field 202 including information regarding an EPC network accessed by the UE, the part corresponding to the ID of the UE, excluding the ID of a group or network equipment accessed by the UE, for example, the M-TMSI part excluding the GUMMEI part in a GUTI, may be encrypted or may be formed to include an authorization code. For the encryption procedure or to generate the authorization code, an encryption key (e.g., NAS security key, etc.), which is shared between the UE and the EPC network in order to allow the UE to access the EPC network, may be used. By using the encrypted information or the authorization key, security or integrity for the contents included in the EPC information field 202 can be checked.

As another embodiment of the present disclosure, a description will be given of a procedure in which a UE accesses an EPC network to obtain authorization for a D2D communication service, generates an expression as described in the above embodiment of the present disclosure, detects the ProSe ID of a counterpart UE by making reference to the expression received from the counterpart UE, and acquires the cellular network ID of the counterpart UE, corresponding to the ProSe ID, to paging the counterpart UE and establish a data connection with the counterpart UE through the cellular network.

Figure 3A:
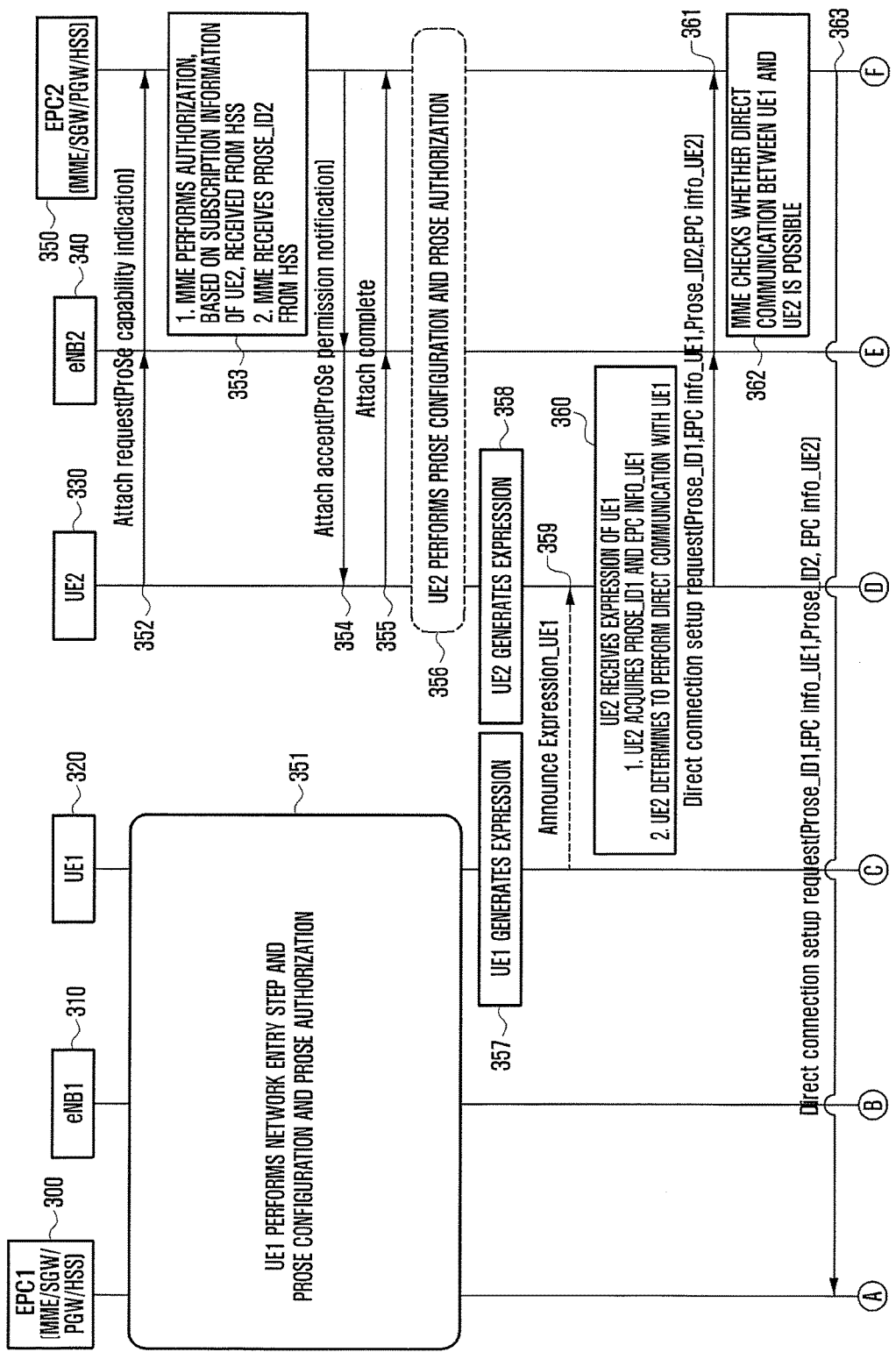
FIGS. 3a and 3b are flow diagrams illustrating a D2D communication procedure according to an embodiment of the present disclosure.
Figure 3B:
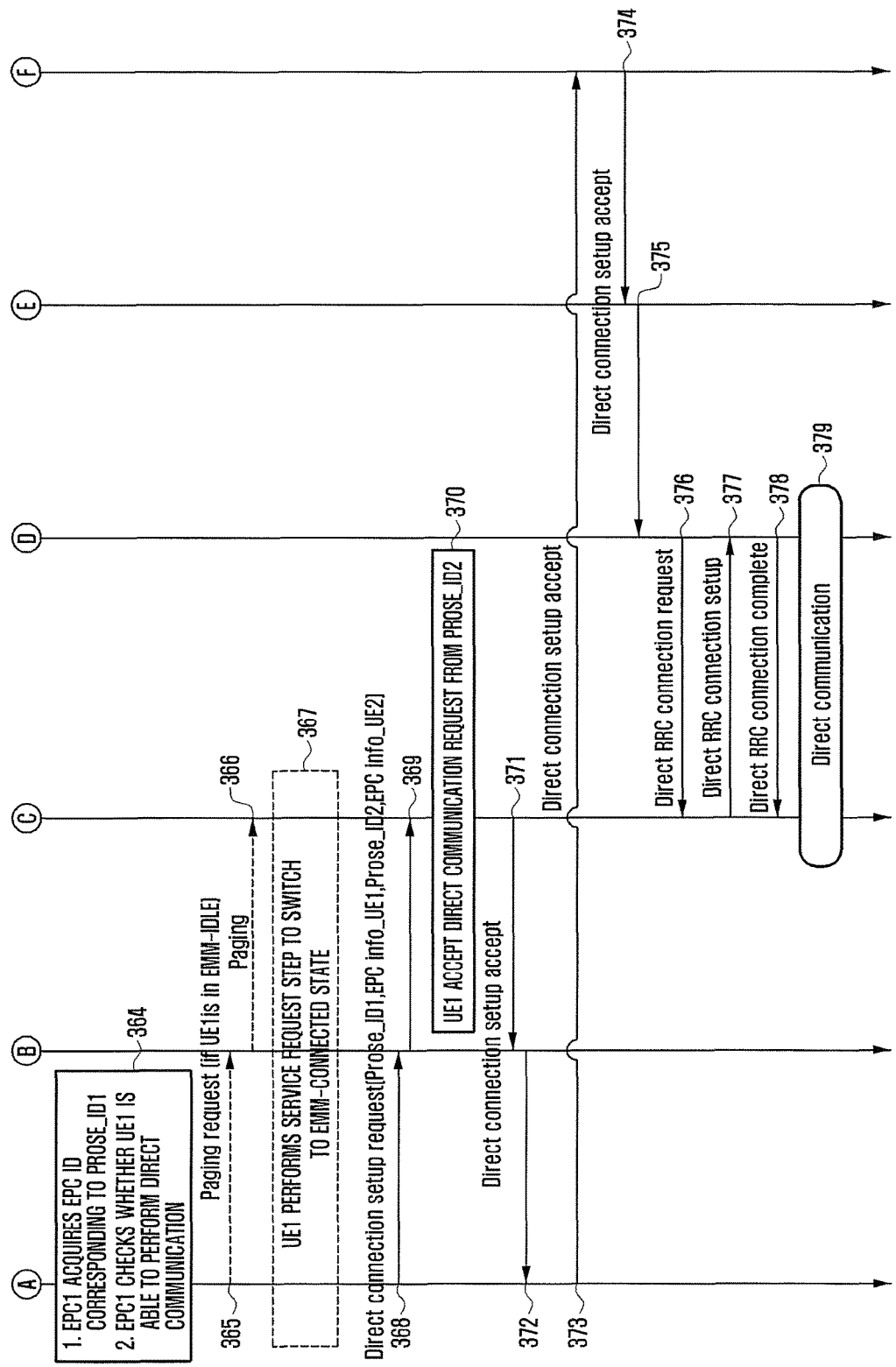

FIGS. 3a and 3b illustrate a D2D communication procedure according to an embodiment of the present disclosure. Hereinafter, FIGS. 3a and 3b will be collectively referred to as "FIG. 3". The embodiment of FIG. 3 relates to a case where the EPC information field 202 of an expression includes the ID of a group or network equipment.

Referring to FIGS. 3a and 3b, through the same procedure, UE1 320 and UE2 330 access EPC1 300 and EPC2 350 respectively, obtain ProSe authorization, and generate an expression, so the following description will be given in conjunction with the procedure performed by the UE2 330.

In step 352, in order to access the EPC2 350, the UE2 330 sends an attach request message to the EPC2 network 350 via the eNB2 340. The attach request message includes a ProSe capability indication indicating that the UE 330 supports D2D communication.

In step 353, authorization for the UE2 330 is performed based on subscription information that the MME of the EPC2 350 receives from the HSS. In this step, the MME may receive ProSe_ID2 (the D2D ID of the UE2 330) together to store and manage mapping information between the UE ID in the EPC2 350 (EPC2 ID) and the ProSe_ID2. Of course, the mapping information may also be stored and managed by network equipment other than the MME. A method will be described below, in which the MME and the like acquires the mapping information in the EPC 2 network.

When the authorization in step 353 is successful, in step 354, the EPC2 350 sends an attach accept message to the UE2 330. The attach accept message includes a ProSe permission notification indicating the result of performing the authorization for D2D communication, based on the subscription information. Upon receiving the attach accept message, in step 355, the UE2 330 sends an attach complete message to the EPC2 350. The network entry procedure of the UE2 330 is completed by step 355. In step 356, the UE2 330 may perform configuration for D2D communication or authorization for a D2D communication service.

Further, in step 358, the UE2 330 generates an expression, as described above in the embodiment of FIG. 2. In the process of the authorization for a D2D communication service, the UE2 330 may receive an Auth key that can be used when the UE2 330 generates an expression, and may also receive an encryption key for use in encrypting a part of the expression or an upper encryption key for generating the encryption key.

In step 351, the UE1 320 enters the EPC1 network 300. Step 351 corresponds to steps 352 to 356, so a detailed description thereof will be omitted here.

In step 357, the UE1 320 generates an expression by using the UE's D2D ID, that is, ProSe_ID1, EPC information (EPC info_UE1), and the like. In step 359, the UE1 320 starts to broadcast the generated expression.

In step 360, the UE2 330 receives the expression broadcasted by the UE1 320 to acquire the ProSe_ID1 from the received expression. That is, the UE2 330 may identify that the D2D ID of the transmitter UE of the corresponding expression is the ProSe_ID1. The UE2 330 acquires the ID of equipment accessed by the corresponding UE 320 in the EPC1 300, for example, a GUMMEI, from the received expression, and determines to perform D2D communication with the UE using the ProSe_ID1.

The UE2 330 does not yet know the EPC ID of the UE using the ProSe_ID1. Thus, in step 361, the UE2 330 sends a direct connection setup request message to the EPC2 350 via the eNB2 340 in order to establish a D2D connection with the ProSe_ID1 user. The direct connection setup request message may include information acquired by the UE2 330, that is, the ProSe_ID1 and EPC info_UE1. Further, the direct connection setup request message may also include the ProSe_ID2 and the EPC info_UE2 of the UE2 330. In step 362, using the EPC info_UE1, the MME of the EPC2 350 may check whether D2D communication between the ProSe_ID1 UE and the ProSe_ID2 UE existing in the UE's network is possible, based on service agreements between providers or other conditions.

When it is determined that D2D communication is possible, in step 363, the EPC2 350 forwards the direct connection setup request message to the EPC1 300 according to the EPC info_UE1. In step 364, the EPC1 300 detects the UE ID in the EPC1 300, that is, the EPC1 ID, mapped to the ProSe_ID1, by using the ProSE_ID1 and the EPC info_UE1 included in the forwarded direct connection setup request message. As an example, this scan step may be performed by the MME of the EPC1 300.

Further, based on the EPC1 ID corresponding to the acquired ProSe_ID1, the EPC1 300 may check whether the corresponding UE, that is, the UE1 320, is able to perform D2D communication.

When it is checked that the UE1 320 is in an EMM-idle mode, in step 365, the MME of the EPC1 300 sends a paging request message to the eNB1 310. In step 366, the eNB1 310 sends a paging message to the UE1 320. Subsequently, in step 367, the UE1 320 performs a procedure for switching to an EMM-connected mode.

Next, in steps 368 and 369, the EPC1 300 forwards the received direct connection setup request message to the UE1 320 in the EMM-connected mode via the eNB1 310.

In step 368, the EPC1 300 sends an S1-AP message, which notifies the eNB1 310 that the direct connection setup is requested, to the eNB1 310, and upon receiving the S1-AP message, the eNB1 310 prepares resource allocation information and the like for the direct connection setup. The S1-AP message and the RRC reconfiguration message in steps 368 and 369 may include the direct connection setup request message.

The EPC1 300 may also forward a message including information on the ProSe_ID2 and the EPC info_UE2, separately generated by the MME, to the UE1 320, instead of the direct connection setup request message. Upon receiving the direct connection setup request message, in step 370, the UE1 320 accepts the D2D communication request from the ProSe_ID2 UE. Accordingly, in step 371 and 372, the UE1 320 sends a message accepting the D2D communication request, that is, a direct connection setup accept message, to the EPC1 300 via the eNB1 310.

Upon receiving an RRC reconfiguration message in step 371, the eNB1 310 may use an S1-AP message in step 372 and procedures in steps 373 and 374 to forward the prepared resource allocation information and the like for the direct connection setup to the eNB2 340 accessed by the counterpart UE2 330. Alternatively, according to a modified embodiment of the present disclosure, the eNB1 340 may directly forward the prepared resource allocation information and the like for the direct connection setup to the counterpart eNB2 340.

In step 373, the EPC1 300 forwards the direct connection setup accept message to the EPC2 350. In steps 374 and 375, the EPC2 350 forwards the direct connection setup accept message to the UE2 330.

In step 374, the EPC2 350 sends an S1-AP message, which notifies the eNB2 340 that the direct connection setup is accepted, to the eNB2 340, and the S1-AP message includes the resource allocation information and the like for the direct connection setup.

The S1-AP message and the RRC reconfiguration message in steps 374 and 375 may include the direct connection setup accept message.

Subsequently, a direct connection radio bearer (D2D radio bearer) is set up using resources allocated by the eNB1 310 and the eNB2 340. As an example, in step 376, the UE2 330 directly sends a direct RRC connection request message to the UE1 320 in order to establish an RRC (Radio Resource Control) connection with the UE1 320. In step 377, the UE1 320 sends a direct RRC connection setup message to the UE2 330. In step 378, the UE2 330 sends a direct RRC connection complete message to the UE1 320. Accordingly, a radio bearer is established. In step 379, the UE1 320 and the UE2 330 perform D2D communication through the established radio bearer.

Figure 4A:
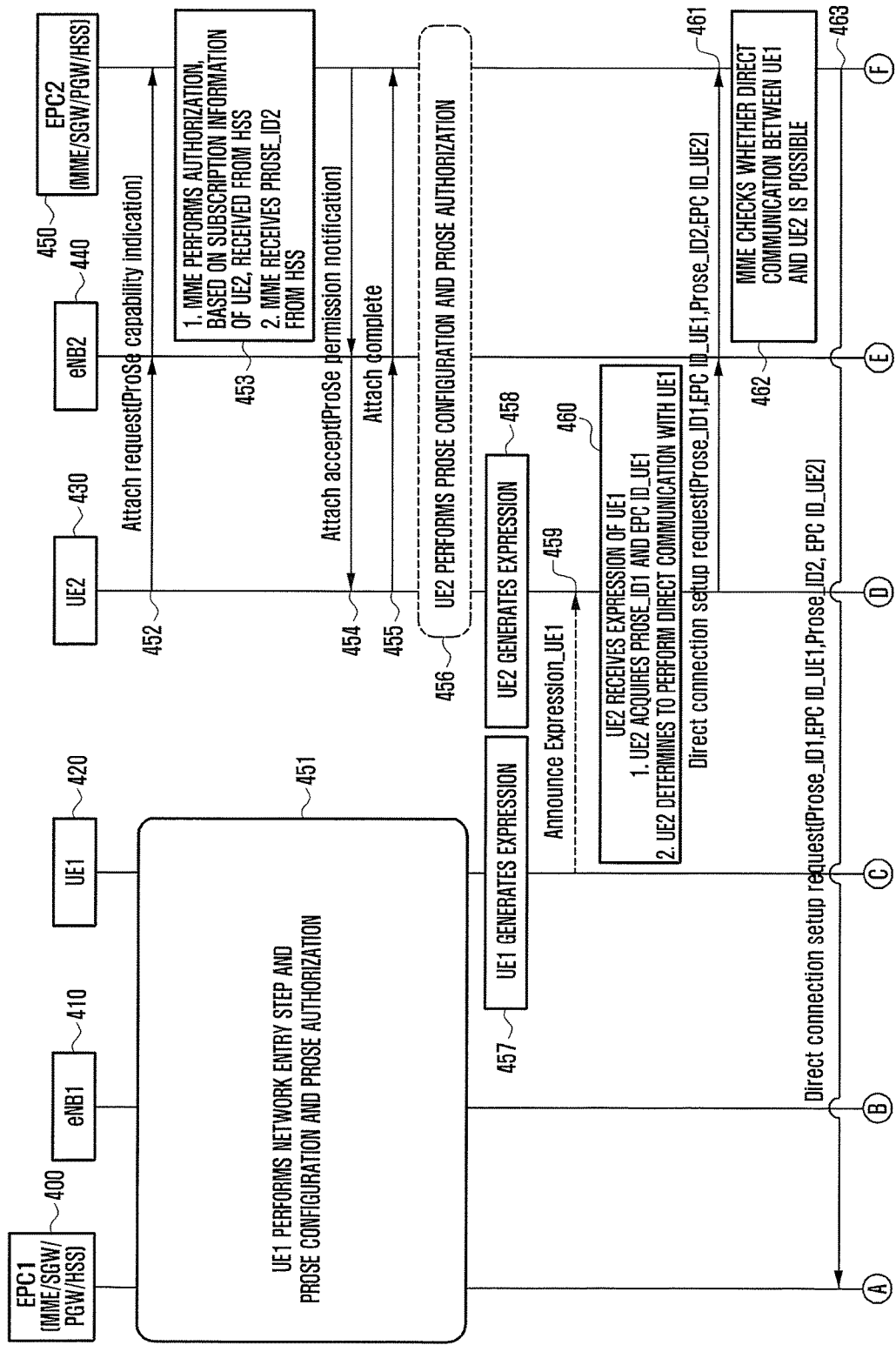
FIGS. 4a and 4b are flow diagrams illustrating a D2D communication procedure according to another embodiment of the present disclosure.
Figure 4B:
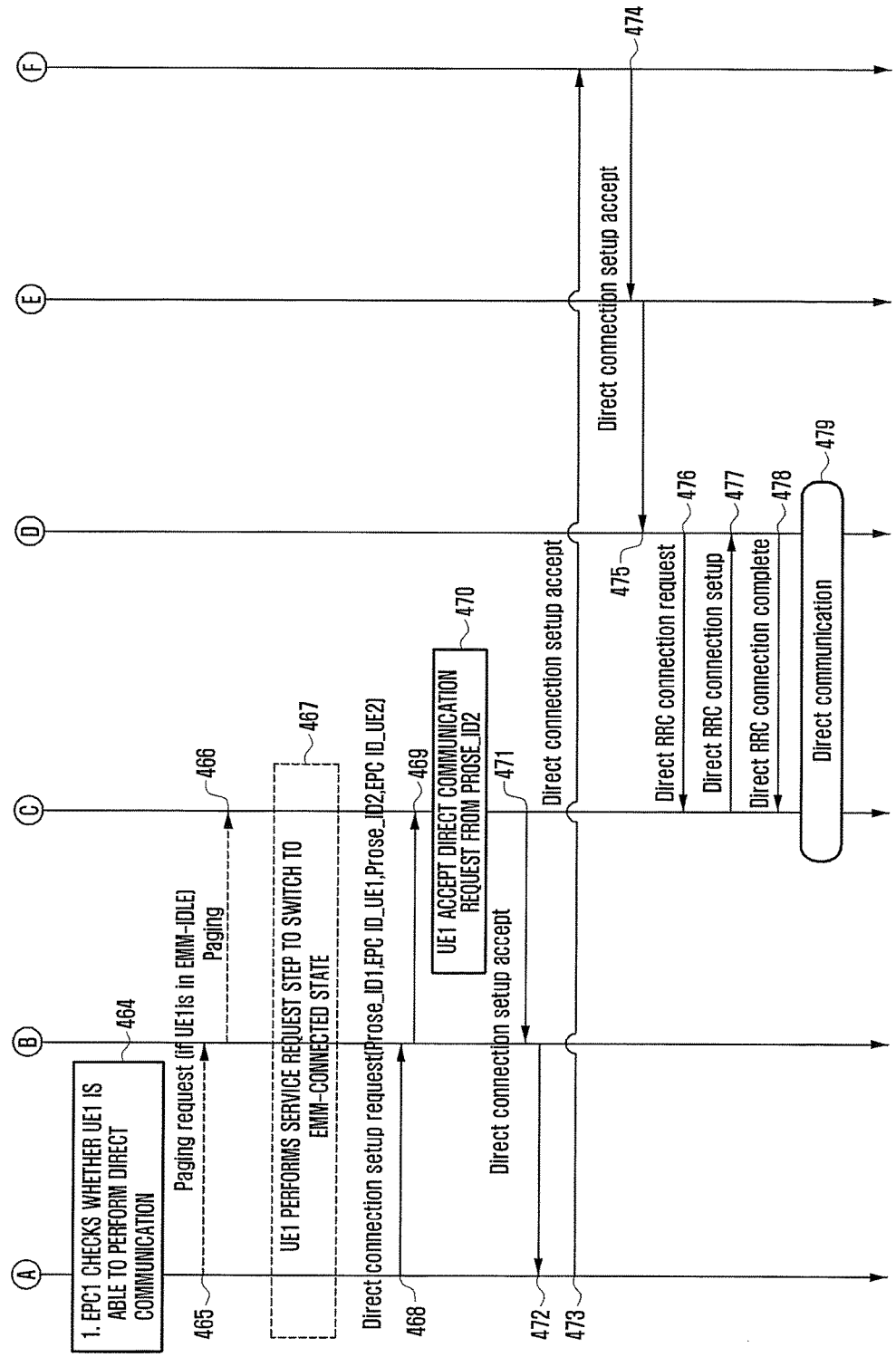

FIGS. 4a and 4b illustrate a D2D communication procedure according to another embodiment of the present disclosure. Hereinafter, FIGS. 4a and 4b will be collectively referred to as "FIG. 4". In particular, the embodiment of FIG. 4 relates to a case where the EPC information field 202 of an expression includes the ID of an UE, allocated from an EPC.

Referring to FIGS. 4a and 4b, through the same procedure, UE1 420 and UE2 430 access EPC1 400 and EPC2 450 respectively, obtain ProSe authorization, and generate an expression, so the following description will be given in conjunction with the procedure performed by the UE2 430.

In step 452, in order to access the EPC2 450, the UE2 430 sends an attach request message to the EPC2 network 450 via the eNB2 440. The attach request message includes a ProSe capability indication indicating that the UE 430 supports D2D communication.

In step 453, authorization for the UE2 430 is performed based on subscription information that the MME of the EPC2 450 receives from the HSS. In this step, the MME may receive ProSe_ID2 (the D2D ID of the UE2 430) together to store and manage mapping information between the UE ID in the EPC2 450 (EPC2 ID) and the ProSe_ID2. Of course, the mapping information may also be stored and managed by network equipment other than the MME. A method will be described below, in which the MME and the like acquires the mapping information in the EPC 2 network.

When the authorization in step 453 is successful, in step 454, the EPC2 450 sends an attach accept message to the UE2 430. The attach accept message includes a ProSe permission notification indicating the result of performing the authorization for D2D communication, based on the subscription information. Upon receiving the attach accept message, in step 455, the UE2 430 sends an attach complete message to the EPC2 450. The network entry procedure of the UE2 430 is completed by step 455. In step 456, the UE2 430 may perform configuration for D2D communication or authorization for a D2D communication service.

Further, in step 458, the UE2 430 generates an expression, as described above in the embodiment of FIG. 2. In the process of the authorization for a D2D communication service, the UE2 430 may receive an Auth key that can be used when the UE2 430 generates an expression, and may also receive an encryption key for use in encrypting a part of the expression or an upper encryption key for generating the encryption key.

In step 451, the UE1 420 enters the EPC1 network 400. Step 451 corresponds to steps 452 to 456, so a detailed description thereof will be omitted here.

In step 457, the UE1 420 generates an expression by using the UE's D2D ID, that is, ProSe_ID1, EPC info_UE1, and the like. In step 459, the UE1 420 starts to broadcast the generated expression.

In step 460, the UE2 430 receives the expression broadcasted by the UE1 420 to acquire the ProSe_ID1 from the received expression. That is, the UE2 430 may identify that the D2D ID of the transmitter UE of the corresponding expression is the ProSe_ID1. The UE2 430 acquires the ID of the corresponding UE 420 (EPC ID_UE1), allocated form the EPC1 400, for example, a GUTI, from the received expression, and determines to perform D2D communication with the UE using the ProSe_ID1.

In step 461, the UE2 430 sends a direct connection setup request message to the EPC2 450 via the eNB2 440 in order to establish a D2D connection with the UE using the ProSe_ID1. The direct connection setup request message may include information acquired by the UE2 430, that is, the ProSe_ID1 and EPC ID_UE1, and may further include the UE's own ProSe_ID2 and EPC ID_UE2. In step 462, using the EPC ID_UE1, the MME of the EPC2 450 may check whether D2D communication between the ProSe_ID1 UE and the ProSe_ID2 UE existing in MME's network is possible, based on service agreements between providers or other conditions.

When it is determined that D2D communication is possible, in step 463, the EPC2 450 forwards the direct connection setup request message to the EPC1 400 according to the EPC ID_UE1. In step 464, the EPC1 400 may also check whether the corresponding UE, that is, the UE1 420, is able to perform D2D communication, by using the EPC ID_UE1 included in the forwarded direct connection setup request message.

When it is checked that the UE1 420 is in an EMM-idle mode, in step 465, the MME of the EPC1 400 sends a paging request message to the eNB1 410. In step 466, the eNB1 410 sends a paging message to the UE1 420. In step 467, the UE1 420 performs a procedure 467 for switching to an EMM-connected mode.

Subsequently, in steps 468 and 469, the EPC1 400 forwards the received direct connection setup request message to the UE1 420 in the EMM-connected mode via the eNB1 410.

In step 468, the EPC1 400 sends an S1-AP message, which notifies the eNB1 410 that the direct connection setup is requested, to the eNB1 410, and upon receiving the S1-AP message, the eNB1 410 prepares resource allocation information and the like for the direct connection setup. The S1-AP message and the RRC reconfiguration message in steps 468 and 469 may include the direct connection setup request message.

The EPC1 400 may also forward a message including information on the ProSe_ID2 and the EPC ID_UE2, separately generated by the MME, to the UE1 420, instead of the direct connection setup request message. Upon receiving the direct connection setup request message, in step 470, the UE1 420 accepts the D2D communication request from the ProSe_ID2 UE. Accordingly, in step 471 and 472, the UE1 420 sends a message accepting the D2D communication request, that is, a direct connection setup accept message, to the EPC1 400 via the eNB1 410.

Upon receiving an RRC reconfiguration message in step 471, the eNB1 410 may use an S1-AP message in step 472 and procedures in steps 473 and 474 to forward the prepared resource allocation information and the like for the direct connection setup to the eNB2 440 accessed by the counterpart UE2 430. Alternatively, according to a modified embodiment of the present disclosure, upon receiving the RRC reconfiguration message in step 471, the eNB1 440 may directly forward the prepared resource allocation information and the like for the direct connection setup to the counterpart eNB2 440.

In step 473, the EPC 1 400 forwards the direct connection setup accept message to the EPC2 450. In step 474, the EPC2 450 sends an S1-AP message, which notifies the eNB2 440 that the direct connection setup is accepted, to the eNB2 440, and the S1-AP message includes the resource allocation information and the like for the direct connection setup.

The S1-AP message and the RRC reconfiguration message in steps 474 and 475 may include the direct connection setup request message.

In steps 474 and 475, the EPC2 450 forwards the direct connection setup accept message to the UE2 430. In step 474, the EPC2 450 sends an S1-AP message, which notifies the eNB2 440 that the direct connection setup is accepted, to the eNB2 440, and the S1-AP message includes the resource allocation information and the like for the direct connection setup.

The S1-AP message and the RRC reconfiguration message in steps 474 and 475 may include the direct connection setup accept message.

Subsequently, a direct connection radio bearer (D2D radio bearer) is set up using resources allocated by the eNB1 410 and the eNB2 440. As an example, in step 476, the UE2 430 directly sends a direct RRC connection request message to the UE1 420 in order to establish an RRC (Radio Resource Control) connection with the UE1 420. In step 477, the UE1 420 sends a direct RRC connection setup message to the UE2 430. In step 478, the UE2 430 sends a direct RRC connection complete message to the UE1 420. Accordingly, a radio bearer is established. In step 479, the UE1 420 and the UE2 430 perform D2D communication through the established radio bearer.

Hereinafter, as another embodiment of the present disclosure, a procedure will be discussed in detail, in which a ProSe_ID is transmitted to the EPC equipment (e.g., MME) of an EPC network, which is in charge of mapping between the ProSe_ID and an ID allocated from the EPC network (EPC ID).

The ProSe_ID information may be transferred to the MME while the MME sends updated location information to the HSS and receives subscription information for a UE from the HSS in the process of network entry of the UE, as described above in step 353 of FIG. 3 and step 453 of FIG. 4. In such a case, a ProSe ID may be transmitted in such a manner that the HSS allocates the ProSe ID pre-stored therein to the EPC equipment in charge of the mapping, for example, the MME.

Figure 5:
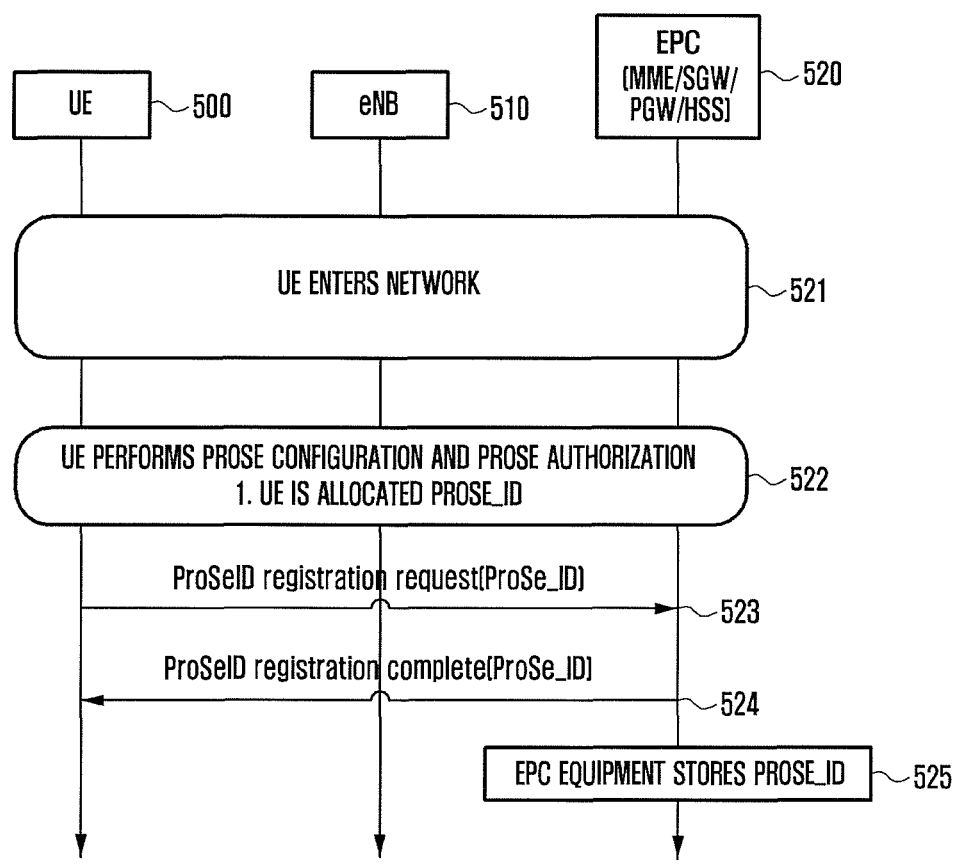
FIG. 5 is a flow diagram illustrating a ProSe ID forwarding procedure according to an embodiment of the present disclosure.

FIG. 5 illustrates a ProSe ID forwarding procedure according to an embodiment of the present disclosure.

Referring to FIG. 5, the eNB 510 is located between the UE 500 and the EPC 520. The EPC 520 may include, for example, an MME, an S-GW, a P-GW, an HSS, and the like. In step 521, the UE 500 accesses the EPC network. In step 522, ProSe configuration and ProSe authorization are performed. In the process of this, the UE 500 acquires a ProSe ID. In step 523, the UE 500 sends a separate NAS (Network Access Stratum) message, that is, a ProSe ID registration request message, to the EPC 520. The ProSe ID registration request message includes the acquired ProSe ID. In step 524, the EPC 520 sends a ProSe ID registration complete message to the UE 500 in response to the ProSe ID registration request message. The ProSe ID registration complete message includes the ProSe ID. The EPC 520 forwards the received ProSe ID to the EPC equipment (e.g., MME) in charge of mapping between the ProSe ID and the ID allocated to the UE 500 from the EPC 520, and the EPC equipment stores the mapping relation between the forwarded ProSe ID and the ID allocated to the UE 500 from the EPC 520. That is, the EPC equipment correlates the ProSe ID and the ID (EPC ID) allocated to the UE 500 from the EPC 520, and stores the correlated ProSe ID and EPC ID.

Figure 6:
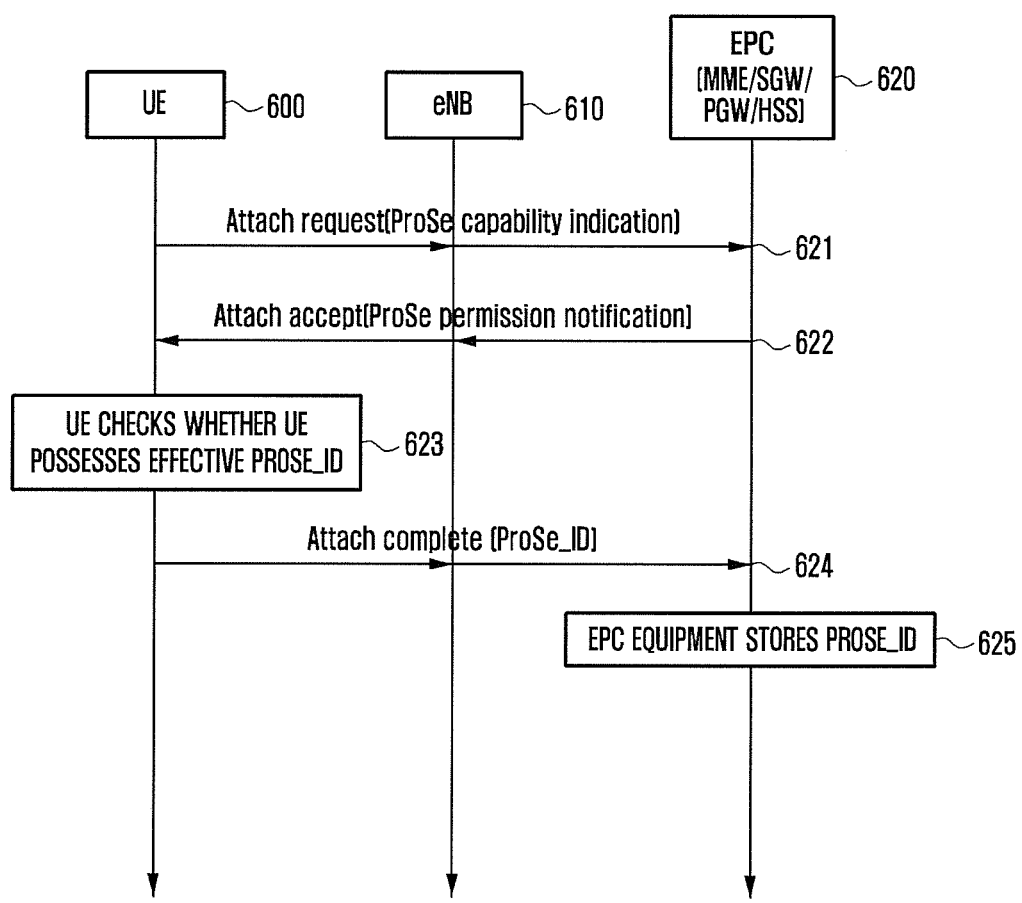
FIG. 6 is a flow diagram illustrating a ProSe ID forwarding procedure according to another embodiment of the present disclosure.

FIG. 6 illustrates a ProSe ID forwarding procedure according to another embodiment of the present disclosure.

Referring to FIG. 6, the eNB 610 is located between the UE 600 and the EPC 620. The EPC 620 may include, for example, an MME, an S-GW, a P-GW, an HSS, and the like. In step 621, the UE 600 sends an attach request message to the EPC 620. The attach request message includes a ProSe capability indication. In step 622, the EPC 620 sends an attach accept message to the UE 600 in response to the attach request message. In step 632, the UE 600 determines if the UE 600 has an effective ProSe_ID. In step 624, the UE 600 sends an attach complete message to the EPC 620. If the UE 600 already possesses an effective ProSe_ID, then the UE 600 sends an attach complete message including the effective ProSe_ID possessed by the UE 600. The ProSe_ID is forwarded to the EPC equipment (e.g., MME) of the EPC 620, which is in charge of mapping the ProSe_ID and the ID allocated to the EPC network (EPC ID). In step 625, the EPC equipment stores the mapping relation between the forwarded ProSe ID and the EPC ID. That is, the EPC equipment correlates the ProSe ID and the ID (EPC ID) allocated to the UE 500 from the EPC 520, and stores the correlated ProSe ID and EPC ID.

Apparatuses used in embodiments of the present disclosure, that is, UEs, eNBs, and constituent entities of EPCs, for example, MMES, s-GWs, P-GWs, and HSSs, may include a communication module and a controller respectively. The communication module of each UE, eNB, and entity of an EPC transmits and receives signals in order to perform operations according to any one of the above embodiments of the present disclosure. The controller of each UE, eNB, and entity of an EPC controls each apparatus to be operated according to any one of the above embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of performing a device-to-device (D2D) communication by a user equipment (UE), the method comprising:
   acquiring, from a base station associated with a first core network, a proximity service identifier (ProSe ID) of the UE used in the D2D communication;
   generating an expression message using the ProSe ID and an identifier of the first core network;
   broadcasting, to at least one other UE, the generated expression message including the ProSe ID and the identifier of the first core network;
   receiving, from the base station associated with the first core network via a second core network, a direct connection request message originated from the at least one other UE in the second core network;
   transmitting, to the at least one other UE, a direct connection accept message in response to the direct connection request message; and
   performing the D2D communication with the at least one other UE,
   wherein the identifier of the first core network is used, by the at least one other UE, to identify the first core network for transmitting the direct connection request message.

2. The method of claim 1, wherein the expression message includes an ID allocated to the UE from the first core network.

3. The method of claim 2, wherein the expression message further includes an ID of an entity that stores a mapping relation between the ProSe ID of the UE and the ID allocated to the UE from the first core network.

4. The method of claim 2, wherein the expression message further includes an ID of an entity that stores a mapping relation between the ProSe ID of a user of the UE and the ID allocated to the UE from the first core network.

5. A method of performing a device-to-device (D2D) communication by a user equipment (UE), the method comprising:
   receiving, from at least one other UE, an expression message broadcasted by at least one other UE;
   acquiring a proximity service identifier (ProSe ID) of the at least one other UE and an identifier of a first core network associated with the at least one other UE from the expression message;
   transmitting, to a base station associated with a second core network, a direct connection request message, wherein the direct connection request message is received, by the at least one UE, via the first core network identified based on the identifier of the first core network and transmitted from the second core network to the first core network;
   receiving, from the at least one UE, a direct connection accept message in response to the direct connection request message; and
   performing the D2D communication with the at least one other UE using the ProSe ID.

6. The method of claim 5, wherein the expression message includes an ID allocated to the at least one other UE from the first core network.

7. The method of claim 6, wherein the expression message further includes an ID of an entity that stores a mapping relation between the ProSe ID of the at least one other UE and the ID allocated to the at least one other UE from the first core network.

8. The method of claim 6, wherein the expression message further includes an ID of an entity that stores a mapping relation between the ProSe ID of a user of the at least one other UE and the ID allocated to the at least one other UE from first the core network.

9. A method of supporting device-to-device (D2D) communication by a communication entity of a core network, the method comprising:
   receiving, from a first user equipment (UE) associated with a first core network, a direct connection request message including a proximity service identifier (ProSe ID) of a second UE and an identifier of a second core network of the second UE for requesting a connection with the second UE, wherein the direct connection request message is transmitted from the first core network to the second core network;
   transmitting, to the second UE, a paging message using the Prose ID and the identifier of the second core network;
   forwarding, to the second UE, the direct connection request message after the second UE is in a connected state;
   receiving, from the second UE, a direct connection accept message in response to the direct connection request message; and
   forwarding, to the first UE, the direct connection accept message,
   wherein the identifier of the second core network is used, by the first UE, to identify the second core network of the second UE.

10. The method of claim 9, further comprising allocating an ID to the second UE for inclusion in an expression message.

11. A user equipment (UE) of performing a device-to-device (D2D) communication, the UE comprising:
    a transceiver configured to transmit and receive a signal; and a controller configured to control to acquire, from a base station associated with a first core network of the UE, a proximity service identifier (ProSe ID) of the UE used in the D2D communication, to generate an expression message using the ProSe ID and an identifier of the first core network, to broadcast, to at least one other UE, the generated expression message including the Prose ID and the identifier of the first core network, to receive, from the base station associated with the first core network via a second core network, a direct connection request message originated from the at least one other UE in a second core network, to transmit, to the at least one other UE, a direct connection accept message in response to the direct connection request message, and to perform the D2D communication with the at least one other UE, wherein the identifier of the first core network is used, by the at least one other UE, to identify the first core network for transmitting the direct connection request message.

12. The UE of claim 11, wherein the expression message includes an ID allocated to the UE from the first core network.

13. The UE of claim 12, wherein the expression message further includes an ID of an entity that stores a mapping relation between the ProSe ID of the UE and the ID allocated to the UE from the first core network.

14. The UE of claim 12, wherein the expression message further includes an ID of an entity that stores a mapping relation between the ProSe ID of a user of the UE and the ID allocated to the UE from the first core network.

15. A user equipment (UE) of performing a device-to-device (D2D) communication, the UE comprising:

a transceiver configured to transmit and receive a signal; and a controller configured to control to receive, from at least one other UE, an expression message broadcasted by at least one other UE, to acquire a proximity service identifier (ProSe ID) and an identifier of a first core network associated with the at least one other UE from the expression message, to transmit, to a base station associated with a second core network of the UE, a direct connection request message, wherein the direct connection request message is received, by the at least one UE, via the first core network identified based on the identifier of the first core network, to receive, from the at least one UE, a direct connection accept message in response to the direct connection request message, and to perform the D2D communication with the at least one other UE using the ProSe ID, wherein the direct connection request message is transmitted from the second core network to the first core network.

16. The UE claim 15, wherein the expression message includes an ID allocated to the at least one other UE from the first core network.

17. The UE of claim 16, wherein the expression message further includes an ID of an entity that stores a mapping relation between the ProSe ID of the UE and the ID allocated to the at least one other UE from the first core network.

18. The UE of claim 16, wherein the expression message further includes an ID of an entity that stores a mapping relation between the ProSe ID of a user of the at least one other UE and the ID allocated to the at least one other UE from the first core network.

19. A communication entity of a core network for supporting device-to-device (D2D) communication, the communication entity comprising:

a transceiver configured to transmit and receive a signal; and a controller configured to receive, from a first user equipment (UE) associated with a first core network, a direct connection request message including a proximity service identifier (ProSe ID) of a second UE and an identifier of a second core network of the second UE for requesting a connection with the second UE, to transmit, to the second UE, a paging message using the Prose ID and the identifier of the second core network, to forward, to the second UE, the direct connection request message after the second UE is in a connected state, to receive, from the second UE, a direct connection accept message in response to the direct connection request message, and to forward, to the first UE, the direct connection accept message, wherein the identifier of the second core network is used, by the first UE, to identify the second core network of the second UE, and wherein the direct connection request message is transmitted from the first core network to the second core network.

20. The communication entity of claim 19, wherein the controller is configured to allocate an ID to the second UE for inclusion in an expression.

* * * * *